US009558605B2

(12) United States Patent
Lynch

(10) Patent No.: US 9,558,605 B2
(45) Date of Patent: Jan. 31, 2017

(54) SYSTEMS AND METHODS FOR AUTHORIZING ACCESS TO FACILITIES

(71) Applicant: MASTERCARD INTERNATIONAL INCORPORATED, Purchase, NY (US)

(72) Inventor: Richard Lynch, Limerick (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/542,228

(22) Filed: Nov. 14, 2014

(65) Prior Publication Data

US 2015/0136848 A1  May 21, 2015

(30) Foreign Application Priority Data

Nov. 15, 2013  (GB) .................................. 1320220.5

(51) Int. Cl.
G06K 7/01 (2006.01)
G07C 9/00 (2006.01)
G06Q 20/34 (2012.01)
G06Q 20/40 (2012.01)

(52) U.S. Cl.
CPC ........... *G07C 9/00103* (2013.01); *G06Q 20/34* (2013.01); *G06Q 20/40* (2013.01); *G06Q 20/405* (2013.01); *G07C 9/00007* (2013.01)

(58) Field of Classification Search
CPC .. G07C 9/00103; G06Q 20/40; G06Q 20/405; G06Q 20/34
USPC .............................. 235/375, 380, 382, 382.5
See application file for complete search history.

(56) References Cited

U.S. PATENT DOCUMENTS

| 6,128,601 | A  | * | 10/2000 | Van Horne | G06F 8/60 235/378 |
| 6,738,750 | B2 | * | 5/2004  | Stone | G06Q 10/00 235/384 |
| 7,376,839 | B2 | * | 5/2008  | Carta | G07C 9/00039 713/185 |
| 7,527,208 | B2 | * | 5/2009  | Hammad | G06Q 20/12 235/382 |
| 7,631,803 | B2 | * | 12/2009 | Peyret | G06Q 20/10 235/380 |
| 7,778,935 | B2 | * | 8/2010  | Colella | G06Q 20/04 235/380 |
| 8,688,554 | B2 | * | 4/2014  | Hammad | G06Q 20/12 235/380 |
| 8,733,663 | B2 | * | 5/2014  | Hammad | G06Q 20/12 235/382 |
| 8,738,485 | B2 | * | 5/2014  | Dixon | G06Q 20/20 194/205 |

(Continued)

*Primary Examiner* — Paultep Savusdiphol
(74) *Attorney, Agent, or Firm* — Harness, Dickey & Pierce, P.L.C.

(57) ABSTRACT

Systems and methods are provided for authorizing access to facilities. In connection therewith, a first request comprising data indicative of a card number is received at a first node. When the first request comprises a request for access to a facility, a set of rules associated with the card number are identified and access to the requested facility is authorized in accordance with the identified set of rules. In addition, a second request comprising data indicative of the card number is received at a second node. When the second request comprises a payment request, a payment provider associated with the card number is identified and the payment request is transmitted to the payment provider.

20 Claims, 5 Drawing Sheets

(56) References Cited

U.S. PATENT DOCUMENTS

| | | | | |
|---|---|---|---|---|
| 9,118,656 B2* | 8/2015 | Ting | ..................... | H04L 63/0815 |
| 2003/0028814 A1* | 2/2003 | Carta | ................. | G07C 9/00039 |
| | | | | 726/21 |
| 2004/0164143 A1* | 8/2004 | Haley | ................ | B42D 15/0053 |
| | | | | 235/380 |
| 2004/0215963 A1* | 10/2004 | Kaplan | ................... | G06F 21/34 |
| | | | | 713/172 |
| 2006/0020517 A1* | 1/2006 | Brooks | ................. | G06Q 30/00 |
| | | | | 705/26.1 |
| 2006/0059365 A1* | 3/2006 | Harper | ................. | G06F 19/323 |
| | | | | 713/186 |
| 2007/0017976 A1* | 1/2007 | Peyret | ................... | G06Q 20/10 |
| | | | | 235/380 |
| 2007/0186106 A1* | 8/2007 | Ting | ..................... | H04L 63/104 |
| | | | | 713/168 |
| 2007/0214093 A1* | 9/2007 | Colella | ................. | G06Q 20/04 |
| | | | | 705/67 |
| 2009/0171682 A1* | 7/2009 | Dixon | ................... | G06Q 20/20 |
| | | | | 705/346 |
| 2009/0184163 A1* | 7/2009 | Hammad | ............. | G06Q 20/12 |
| | | | | 235/380 |
| 2010/0320268 A1* | 12/2010 | Brooks | ................. | G06Q 30/00 |
| | | | | 235/382 |
| 2013/0008958 A1* | 1/2013 | Smith | ................... | G06Q 20/00 |
| | | | | 235/382 |
| 2013/0179201 A1* | 7/2013 | Fuerstenberg | ..... | G06Q 30/0255 |
| | | | | 705/5 |

\* cited by examiner

SYSTEMS AND METHODS FOR AUTHORIZING ACCESS TO FACILITIES

CROSS-REFERENCE TO RELATED APPLICATION

This application claims the benefit of and priority to Great Britain Application No. 1320220.5 filed Nov. 15, 2013. The entire disclosure of the above application is incorporated herein by reference.

FIELD

The present disclosure relates to authorization of access to a facility. More particularly, the disclosure relates to methods and systems of processing requests for access to a facility and authorization of access to the requested facility in accordance with the request.

BACKGROUND

This section provides background information related to the present disclosure which is not necessarily prior art.

Systems for authorizing access to a resource or facility based on an identity or membership number are known. Such systems may, for example, be implemented over a network, in which case a request for access may be transmitted to a network node. Responsive to receiving the request, the network node may authorize or deny access to the facility. However, as the use of such systems increases, unnecessary repetition of processing steps may arise resulting in network congestion and delays in authorization of requests. Furthermore, individual processing of requests for access to each respective resource or facility makes it impossible to combine information across multiple resources to increase efficiency.

These problems may be exacerbated by a need for users to obtain an individual identity or membership number for each respective resource or facility to be entered, resulting in frequent inputting of incorrect identities which further adds to the processing requirements of the system, resulting in increased delays in authorization of requests.

It would therefore be desirable to provide an improved system for authorizing a request for access to a facility.

SUMMARY

This section provides a general summary of the disclosure, and is not a comprehensive disclosure of its full scope or all of its features.

In accordance with an aspect of the present disclosure, there is provided a method of processing requests comprising data indicative of a card number, the method comprising: receiving, at a first network node, a first request comprising data indicative of a card number; and operating a processor to: determine that the first request comprises a request for access to a facility; identify a set of rules associated with the card number; and authorize access to the requested facility in accordance with the identified set of rules; receiving, at a second network node, a second request comprising data indicative of the card number; and operating a processor to: determine that the second request comprises a payment request; identify a payment provider associated with the card number; and transmit the payment request to the determined payment provider.

In this manner, a card number that can be used to effect a payment can also be used to access a facility.

At least one of the first request and the second request may be received via one or more of: a magnetic card reader; an integrated circuit card terminal; a radio frequency identification receiver, such as, but not limited to, a near field communication (NFC) reader; and a Bluetooth™ receiver.

The method may further comprise operating a processor to: identify a number of requests for access to a facility that are received and/or authorized over a predefined period of time; and allocate a resource in accordance with the identified number of received and/or authorized requests. In this manner, resources can effectively be managed in accordance with a number of users requesting and/or obtaining access to a facility.

Operating a processor to determine that the first request comprises a request for access to a facility may comprise operating the processor to: identify, in the first request, a parameter indicative of a requested facility. For example, the first request may be received from a terminal located at an entry point to the facility and the parameter may be indicative of the terminal location. In this example, operating a processor to allocate a resource in accordance with the identified number of requests may comprise operating the processor to: activate at least one further terminal to receive requests for access to the facility.

Operating a processor to identify the set of rules associated with the card number may comprise operating the processor to: determine a condition for authorized access to the facility by a holder of the card. The condition may, for example, comprise at least one of: a predefined period of time for which the card holder is authorized to access the facility; a predefined number of occasions on which the card holder is authorized to access the facility; and a type of facility which the card number is authorized to access.

Operating a processor to authorize access to the requested facility in accordance with the identified set of rules may comprise operating the processor to perform at least one of: authorizing access to the requested facility in response to determining that the received request for access meets the condition; and refusing access to the requested facility in response to determining that the received request for access does not meet the condition.

In some embodiments, the card number is a virtual card number.

Operating a processor to identify a set of rules associated with the card number may comprise operating the processor to: identify a parent card number associated with the card number; and determine a set of rules associated with the parent card number; and apply the set of rules associated with the parent card number to the card number.

Operating a processor to identify the payment provider may comprise operating the processor to: identify a parent card number associated with the card number; and determine a parent payment provider associated with the parent card number; and identify the payment provider for the card number as the parent payment provider.

The method may further comprise operating a processor to: identify at least one payment parameter associated with the payment request; compare the identified payment parameter to a set of authorized payment parameters associated with the card number; determine, based on said comparison, whether the payment request is an allowable payment request; and responsive to determining that the payment request is an allowable payment request, to effect payment from an account associated with the parent card number.

One or more of the first request and the second request may be received from a mobile computing device. For example, the mobile computing device comprises a smartphone, and the one or more of the first request and the second request is received via a radio frequency identification receiver.

According to a further aspect of the disclosure, there is provided a system for processing a request comprising a card number, the system comprising: a first node configured to receive a first request; and a first processor configured to: determine that the first request comprises a request for access to a facility; identify a set of rules associated with the card number; and authorize access to the requested facility in accordance with the identified set of rules; a second network node configured to receive a second request comprising said data; and a second processor configured to: determine that the second request comprises a payment request; identify a payment provider associated with the card number; and transmit the payment request to the determined payment provider.

The request for access to the facility and the request for payment may be received by the same network node. In this case, the first and network nodes may comprise, or be comprised within, a single node. Similarly, the first processor may be the same as the second processor. Accordingly, the first processor and/or the second process may be configured to carry out any of the above described methods.

The first processor may be configured to identify a number of requests for access to a facility that are received over a predefined period of time; and allocate a resource in accordance with the identified number of requests.

In accordance with a further aspect of the system, there is provided a non-transitory computer-readable medium comprising instructions which, when executed, cause a processor to carry out any of the above-described methods.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. Embodiments of the present disclosure will now be described, by way of example only, with reference to the accompanying drawings, in which.

Corresponding reference numerals indicate corresponding parts throughout the several views of the drawings.

DETAILED DESCRIPTION

Figure 1:
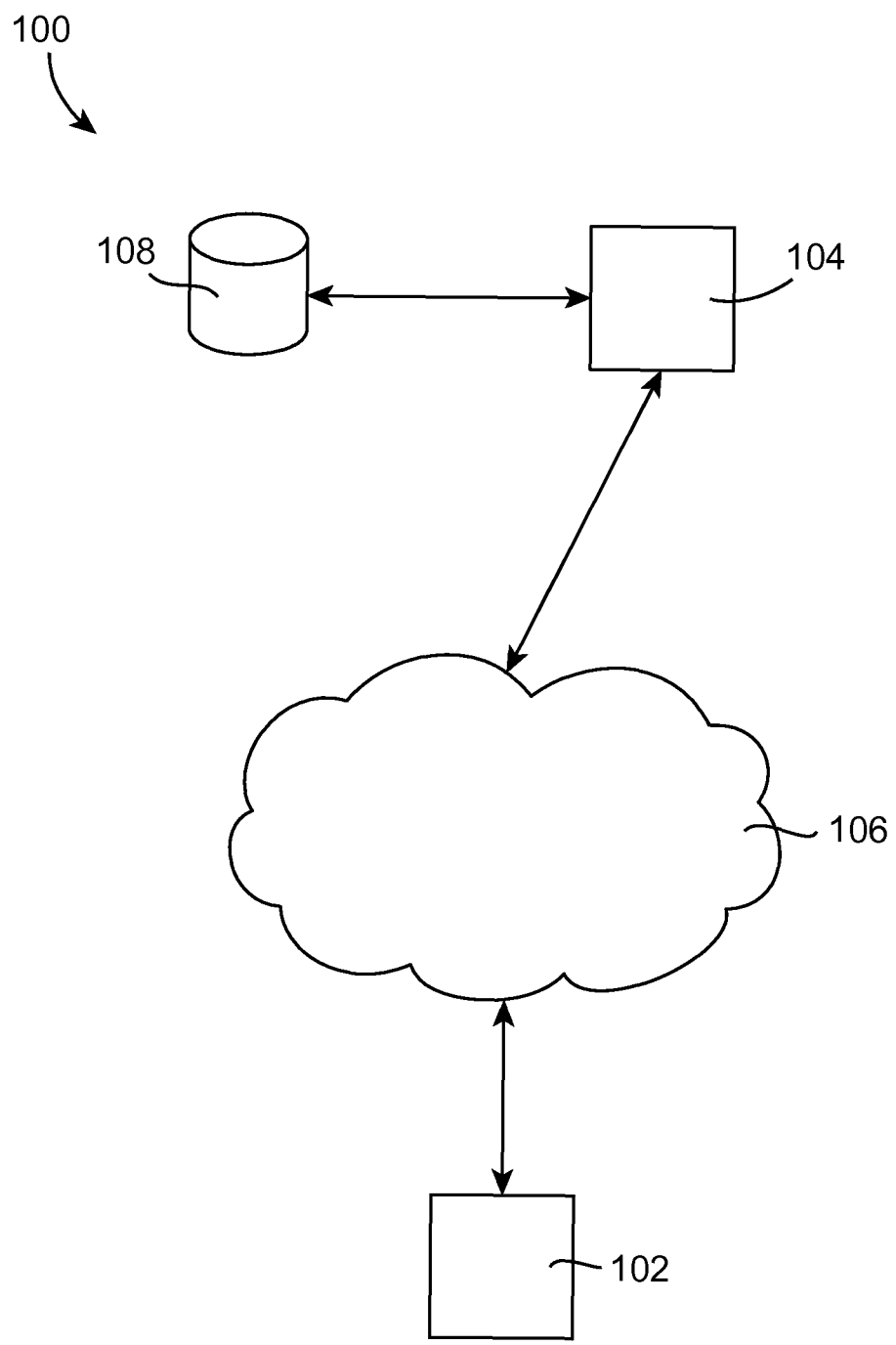
FIG. 1 is a diagram of an authorization system in accordance with an embodiment of the disclosure.

Specific embodiments of the present disclosure will be described below with reference to the Figures. The description and specific examples included herein are intended for purposes of illustration only and are not intended to limit the scope of the present disclosure.

Embodiments of the system comprise an authorization system 100 for processing a request for access to a facility. The system 100 comprises at least one user terminal 102 capable of, or adapted to, transmit a request to a network node 104 over a network 106.

The at least one user terminal 102 may comprise one or more devices of the same type. Alternatively, the at least one user terminal 102 may comprise a plurality of devices of different types. The user terminal 102 may comprise, or be comprised within, a physical terminal. For example, the at least one user terminal 102 may comprise one or more of: a portable computing device (e.g. a laptop computer, a smartphone, a tablet computer etc.); a desktop computer; a Point Of Sale (POS) or merchant terminal; a terminal located at an entry to a facility (e.g. a terminal comprising or comprised within an access terminal such as a swipe-card access system); and any other terminal suitable for communicating a request over the network 106.

The network node 104 may comprise, or be comprised within, any suitable device. For example, the network node 104 may comprise, or be comprised within, a remote server. Additionally or alternatively, the network node 104 may be comprised within a base station. In what follows, the network node 104 will be referred to as a single node within the system 100. However, it will be appreciated that the network node may comprise multiple individual nodes at which the request is processed and/or re-transmitted.

Similarly, in what follows, the method steps are described as being performed by the network node 104. However, it will be appreciated that these steps may be performed by other elements of the system 100, or by one or more processors comprised within, or operated by, the network node 104 and/or other elements of the system 100.

The network node 104 may be configured to communicate with one or more respective databases 108, for example, via a wired or wireless connection. For example, the network node 104 may write data to the one or more databases 108. Additionally or alternatively, the network node 104 may retrieve data stored in, or accessible to, the database 108.

The network node 104 may be a network node associated with (linked to, operated on behalf of, comprised within a system of etc.) a facility provider. The facility provided may be a physical facility. For example, the network node 104 may be associated with a provider of a facility such as a theme park; a sports stadium; a ski resort; a gym; an office; a train station and/or any other type of facility with restricted access (i.e. to which access is granted to authorized users only).

Additionally or alternatively, the facility provided may be a virtual facility. For example, the network node 104 may be associated with an online service such as pay-per-view TV; a web forum; an online game; and/or any collection of data with restricted access.

The network node 104 may be an 'acquirer network node,' for example, a point of sale POS or other such device associated with (linked to, operated on behalf of, comprised within a system of, etc.) a financial institution that processes (or facilitates) card payments made to a merchant. Additionally or alternatively, the network node 104 be one or more of a network node associated with (linked to, operated on behalf of, comprised within a system of etc.) a card issuer (or provider); and/or a card payment network node associated with a third party operating as, or in association with, a payment provider.

The user terminal 102 may communicate with the network node 104 using any suitable means. For example, the user terminal 102 and the network node 104 may communicate using one or more of Bluetooth™; Near-Field Communication (NFC); Infra-Red (IR) Communication; Magnetic Induction; or over a wired or wireless network 106.

In an exemplary embodiment, the network 106 may comprise any network across which communications can be transmitted and received. For example, the network 106 may comprise a wired or wireless network. The network 106 may, for example, comprise one or more of: the internet; a local area network; a radio network such as a mobile or cellular network; a mobile data network or any other suitable type of network. In one embodiment the user terminal 102 communicates over the internet with the network node 104 operating on 'a cloud'.

Figure 2:
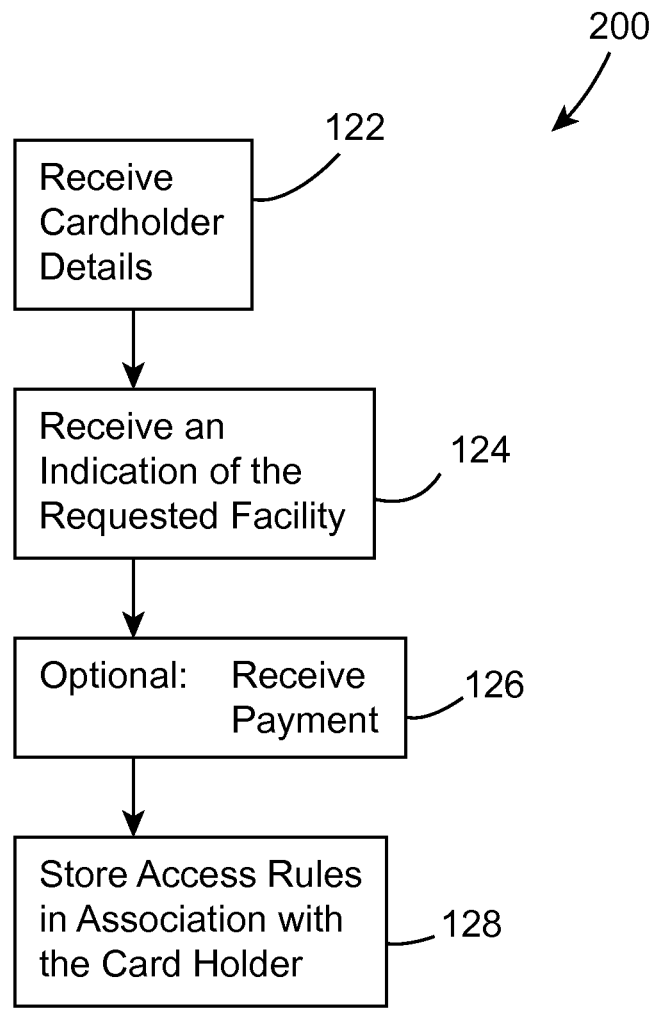
FIG. 2 is a flow diagram depicting a method of registering to use the system of FIG. 1 in accordance with an embodiment of the disclosure.

Prior to using the system 100, a cardholder may complete a registration process 200 in order to obtain an authorization to use a facility. FIG. 2 depicts an exemplary method 200 of registering a cardholder to use the system 100. The registration process 200 may be performed at the network node 104. Additionally or alternatively, the registration process 200 may be performed at the user terminal 102; or any other suitable device configured to communicate with the network node 104.

At block 122, the network node 104 receives details of a cardholder wishing to use the authorization system 100. The details are received via a registration interface (not shown) which may be provided in any suitable manner. For example, the registration interface may be provided online via a website associated with one or more of a card provider and a facility provider (not shown), via a telephone service, in person etc. In some embodiments, a user wishing to access a facility may perform the registration at a booking office (or entry terminal) prior to entering the facility.

The details received at block 122 comprise a card number of a debit or credit card, which may be referred to as a Primary Account Number (PAN). The card number comprised within the received details may be a number of a physical (regular or actual) credit and/or debit card, e.g. a number printed on a cardholder's card and linked to a cardholder's account. The card number comprised within the request may additionally or alternatively be a virtual card number (a dynamic credit card number, a controlled payment number, an alias number, a one-time use credit card number, a substitute credit card number, a rechargeable credit card number etc.). A virtual card number is generated by a card issuer and is linked to at least one physical card number and account. The virtual card number may, for example, be generated via a Web application or a specialized client program provided by, or associated with, an issuer of the physical card number to which the virtual card number is linked.

The details received at block 122 may additionally comprise further information about the card holder. For example, the details received at block 122 may comprise demographic information about the cardholder, for example, the cardholder's date of birth; address; preferences, etc.

In an exemplary embodiment, the details received at block 122 may comprise information necessary to authorize a payment from an account associated with the cardholder. In particular, the details received may comprise information indicative of one or more of: the cardholder's name and/or date of birth; the expiry date of the card; the issue date of the card; the cardholder's address; the credit card verification (CCV) number of the card; and a response to a security question previously set by the cardholder.

At block 124, the network node 104 receives data indicative of one or more facilities that the cardholder would like to access. For example, in an embodiment in which the facility is a ski resort, the cardholder may specify a number of slopes that he/she wishes to use. Similarly, in an embodiment in which the facility is pay-per-view TV programming, the cardholder may specify one or more programs or channels which he/she wishes to view.

The information received at block 124 may additionally comprise information about a condition or 'type' of access required. For example, the received information may also comprise an indication of a number of times the cardholder wishes to access the facility. For example, the cardholder may wish to access the facility on a once-off basis only. Alternatively, the cardholder may wish to access the facility a predefined number of times and/or at regular or irregular intervals indefinitely or over a predefined period of time. In this case, the details provided on registration may be updated or modified at any stage. Any other suitable scenarios or situations may also be indicated as situations in which the cardholder requires access to the requested facility. For example, in an embodiment in which the facility is a ski-slope, the cardholder may wish to access the slope for one or more of: a single day; at any time during a vacation; and at specified periods or times during the ski season.

At block 126, the registration process may optionally comprise a step of receiving a payment associated with the one or more facilities indicated at block 124. In this case, the network node 104 may process the payment using the card number and other details provided at block 122. The network node 104 may process the payment in any suitable manner. In an exemplary embodiment, the network node 104 transmits or communicates an authorization (or payment) request to an acquirer node, which in turn transmits the payment request to a provider associated with the card number for authorization. The provider transmits a response to the acquirer node and/or the network node 104 and responsive to receiving a positive authorization from the provider, the network node 104 determines that the payment has been completed.

In some embodiments, a payment is not received at block 126. Such embodiments include, for example, scenarios in which the cardholder has previously paid for, or is otherwise entitled to, access to the facility. For example, the cardholder may have paid for access to a ski slope when paying for a ski holiday. Additionally or alternatively, the facility may be free to access but may require pre-registration. For example, in an embodiment in which the facility comprises a library (virtual or otherwise), it may be necessary to register before books or documents can be accessed.

At block 128, the network node 104 stores the information received at blocks 122 to 126 in one or more databases 108. The received information may be stored as one or more access rules specifying the conditions under which the card number received at block 122 is entitled to access the facility indicated at block 124. The stored access rules may be accessed by the network node 104 or by any other node of the authorization system 100 during processing of a request for access to a facility. The one or more databases 108 may comprise any suitable storage means accessible by a secured wired or wireless connection. For example, the one or more databases 108 may be hosted on a 'cloud' and may be accessible via the internet.

Figure 3:
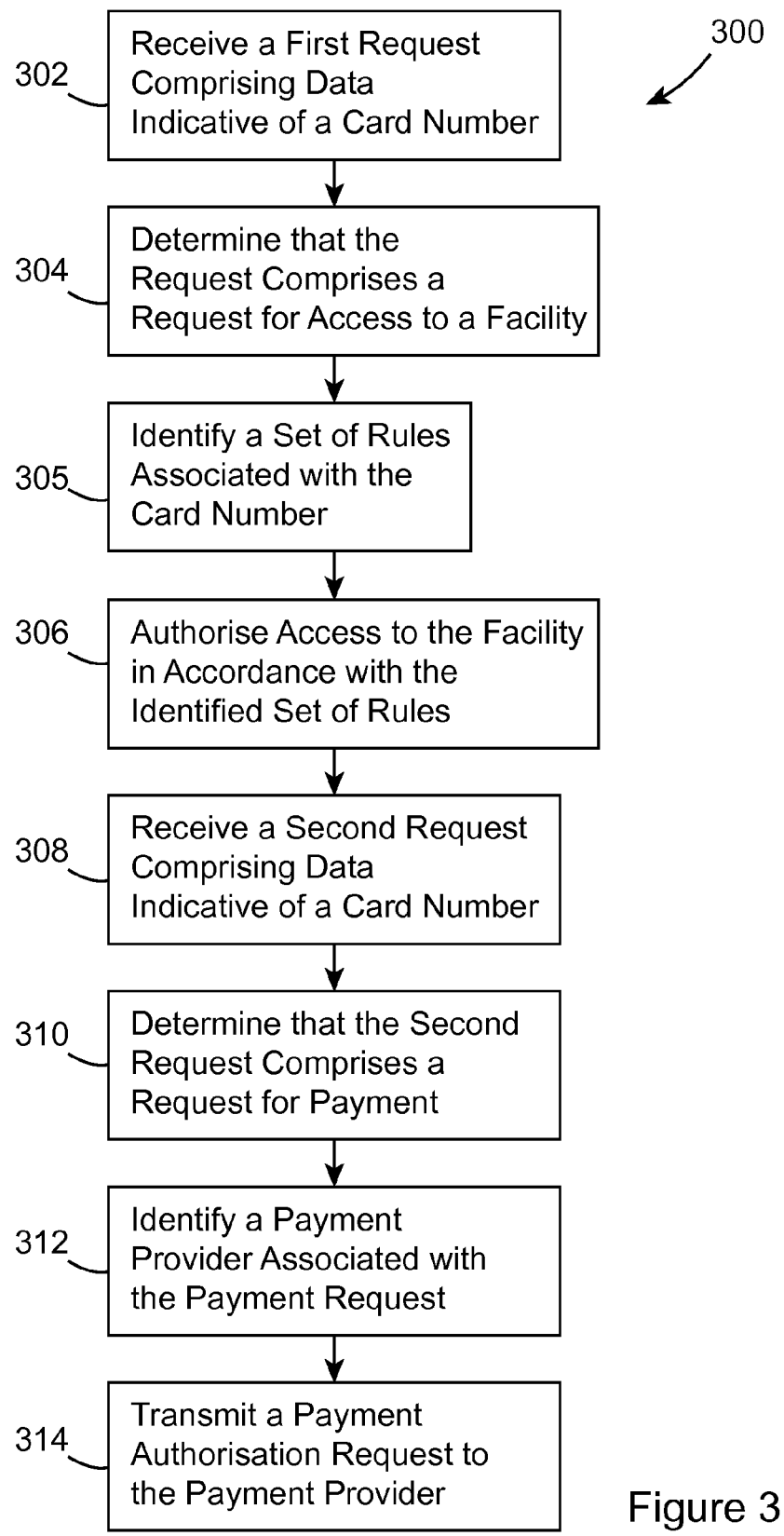
FIG. 3 is a flow diagram depicting a method of processing a request for authorization in accordance with an embodiment of the disclosure.

FIG. 3 depicts an exemplary method 300 of operating the system 100 to process a request for access to a facility in accordance with an embodiment of the disclosure. The processing steps performed by the group payment node 104 may be performed by any suitable processing circuitry. For example, the method 200 may be performed by one or more processors operating at, or in association with, the network node 104.

At block 302, the network node 104 receives a first request comprising data indicative of a card number (or PAN). The request received at block 302 may be received from the user terminal 102. Additionally or alternatively, the request may be received from any other node or element in the system 100. It will be appreciated that the information comprised within the request may be encoded or encrypted in any suitable manner in which case the network node 104 will decode or decrypt the received information.

As discussed in relation to FIG. 2, the card number may be a number of a physical (regular or actual) credit and/or debit card, e.g. a number printed on a cardholder's card and linked to a cardholder's account. Additionally or alternatively, the card number may be a virtual card number (a dynamic credit card number, a controlled payment number, an alias number, a one-time use credit card number, a substitute credit card number, a rechargeable credit card number, etc.).

At block 304, responsive to receiving the first request, the network node 104 determines that the request comprises a request for access to one or more facilities. The network node 104 may be operated to determine that the request comprises a request for access to a facility in any suitable manner.

In some embodiments, the network node 104 identifies a parameter or 'flag' comprised within the request and which is determined to be indicative that the received request comprises a request for access to a facility. The identified parameter may, for example, comprise one or more of: the card number; an indication of an identity of the terminal 102 from which the request was received; and any other suitable flag included in the request. In an exemplary embodiment, the network node 104 may determine that requests received from a user terminal 102 associated with a facility provider, e.g. at an entry to a ski slope or a sports venue, are requests for access to the facility.

Additionally or alternatively, responsive to determining that the request does not comprise sufficient information for a payment request (e.g. information indicative of one or more of a payment amount; a CCV number; a card expiry date; etc.) the network node 104 may determine that the request is a request for access to a facility.

At block 305, the network node 104 identifies a set of rules stored in association with the card number. In an embodiment in which the user completed the registration process described in relation to FIG. 2, the network node 104 may access the set of rules stored in the database 108 during the registration process. Additionally or alternatively, the network node 104 may access any other rules stored in association with the card number indicated in the received request. For example, the network node 104 may access a set of rules stored by, or in association with, a card provider in relation to card numbers provided by the provider. Identification of a set of rules associated with the card number is discussed further in relation to FIG. 5.

At block 306, the network node 104 determines, based on the identified set of rules, whether the card holder is authorized to access the requested facility.

In an exemplary embodiment, the network node 104 determines, from the identified set of rules, a condition (situation, scenario etc.) under which a request comprising the identified card number should be authorized to access a facility. For example, the network node may determine that a holder of the card associated with the card number is authorized to access a facility a predefined number of times, or during a predefined period of time, etc.

The network node 104 may then determine whether the request for access to the facility meets the determined condition. Responsive to determining that the request meets the determined condition, the network node 104 authorizes access to the requested facility. For example, in an embodiment in which the facility is a ski slope, the access rules may specify that a holder of a card associated with the card number is authorized to access the slope during a predefined period. Responsive to determining that the request for access is received within the predefined period, the network node 104 authorizes the card holder to access the slope. The authorization may be provided in any suitable form. For example, the authorization may result in an opening of a barrier or automatic gate; or a user being provided with rights to access a restricted website and/or TV channel; or the provision of any other type of access to a restricted facility.

Responsive to determining that the request does not meet the determined condition, the network node 104 denies access to the request facility. For example, in the above embodiment, responsive to determining that the request for access to the ski slope is received at a time other than the predefined period, the network node 104 denies the card holder access to the slope.

At block 308, the network node 104 receives a second request comprising data indicative of the card number. The second request may be received from a user terminal 102. The network node at which the second request is received may be different to the node at which the first request is received. For example, the first and second requests may be received by respective network nodes within the system 100. It will therefore be appreciated that the processing steps described in relation to blocks 302 to 306 may be performed separately from the steps described in relation to blocks 308 to 314. Similarly, whilst the second request may be received from the user terminal 102 from which the first request was received, the first and second requests may be received from respective user terminals.

At block 310, the network node 104 determines that the second request comprises a request for payment. As described in relation to block 304, the network node 104 may perform this determination in any suitable manner. In an exemplary embodiment, the network node 104 may identify (or extract) one or more parameters from the second request, and based on the identified parameters, the network node 104 may determine that the request is a request for payment. For example, the network node 104 may determine that the second request is a request for payment if the request is determined to include data indicative of one or more of: a payment amount; a payment recipient; a CCV number; an expiry date of a card associated with the card number; and a name and/or address of the cardholder.

Additionally or alternatively, the network node 104 may determine that the request is a request for payment based on (or in accordance with) a user terminal 102 from which the request is received (or from which the request is determined to originate). For example, if the request originates from a merchant terminal located at a Point of Sale (either physical or virtual), the network node 104 may determine that the request is a request for payment.

At block 312, the network node 104 identifies or determines a payment provider associated with the received payment request. The network node 104 may identify the payment provider based on the information comprised within the second request in any suitable manner.

In an exemplary embodiment of the disclosure, at block 312, the network node 104 determines that the card number indicated in the payment request is associated with a parent (i.e. a second) card number. For example, the card number indicated in the payment request may be a virtual card number and the associated parent card a 'regular' card number. Additionally or alternatively, the card number indicated in the payment request may be a card number provided to a child or teenager and which is associated with a parent's card number.

The network node 104 may determine the associated parent card number in any of the manners discussed below in relation to block 502 of FIG. 5 and may then identify the payment provider associated with the request to be a payment provider associated with the parent card number.

At block 314, the network node 104 transmits a payment authorization request to the identified payment provider.

In an embodiment in which the card number indicated in the payment request is associated with a parent (or second) card number, at block 314 the network node 104 transmits the payment authorization request to a payment provider associated with the second card. Before transmitting the payment authorization request to the payment provider associated with the second card, the network node 104 may first determine whether the payment request meets one or more authorization rules or conditions.

In an exemplary embodiment, the network node 104 determines whether a parameter associated with the payment request meets a predefined condition or rule under which the card can be used. The predefined condition or rule may, for example, be stored at block 128 of the registration process. For example, a parent may specify that a child is only authorized to use a card number associated with the parent's card number to make purchases less than a predefined amount, and/or at a predefined list of merchants.

The payment parameter may, for example, be any one or more of: the card number indicated in the payment request; a time and/or location at which the payment request is made; a payment amount; a recipient of the payment; or any other parameter associated with or indicated by the payment request. Responsive to determining that the identified parameter meets a predefined condition for use, the network node 104 transmits the payment authorization request to the payment provider associated with the second card. In this manner, only payment requests meeting criteria or rules specified by the second/parent card holder are authorized.

Figure 4:
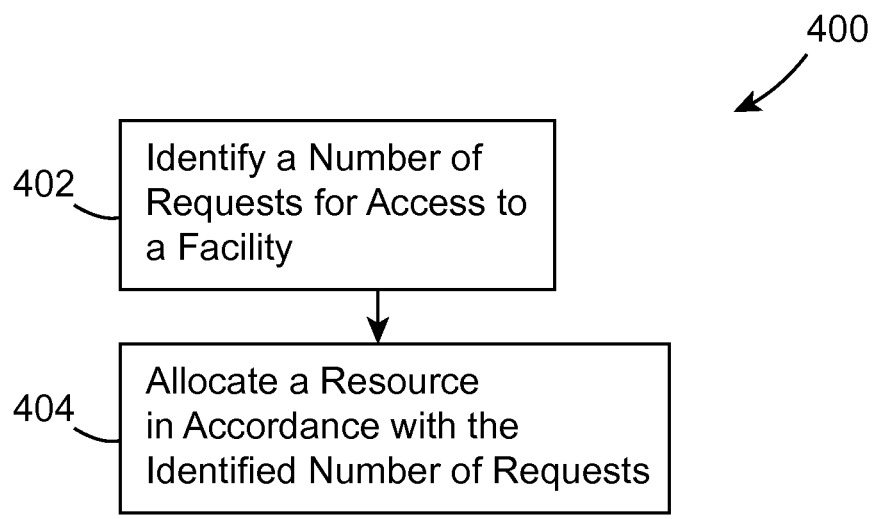
FIG. 4 is a flow diagram depicting a method according to an embodiment of the disclosure.

FIG. 4 depicts a method 400 according to an embodiment of the disclosure, in which the method 400 is performed subsequent to performing some or all of the steps of the method 300 multiple times.

At block 402, the network node 104 identifies a number of requests for access to a facility that have been received over a pre-defined period of time. For example, in an embodiment in which the facility is a theme park or sports venue, the network node may identify a number of people wishing to access the park or venue on a given day, or in a given time period.

In some embodiments, in addition to or alternatively to identifying the number of requests for access received, the network node 104 may identify the number of authorized requests, i.e. the number of requests for access to the facility that have been authorized. In this manner, the network node 104 can monitor a number of card holders currently authorized to access the facility.

The network node 104 may store data indicative of a number of received and/or authorized access requests together with information relating to a time period associated with the requests. This information may, for example, be stored in a database 108. Additionally or alternatively, the network node 104 may communicate this information to one or more other elements within the system 100.

Identification of the number of requests received at block 402 may comprise identifying a number of requests received from an individual terminal 102. The network node 104 may store data indicative of a number of received and/or authorized access requests together with information relating to a time period associated with the requests and a terminal 102 from which the requests were received. This information may, for example, be stored in a database 108. Additionally or alternatively, the network node 104 may communicate this information to one or more other elements within the system 100.

At block 404, the network node 104 allocates a resource in accordance with the identified number of requests. In an exemplary embodiment, responsive to determining that the number of received and/or authorized requests is greater than a predefined number, the network node 104 may allocate further resources within the facility.

For example, responsive to determining that a number of requests received from a first user terminal 102 is greater than a predefined threshold, the network node 104 may activate one or more further terminals to avoid congestion at the first terminal. For example, in an embodiment in which the first user terminal 102 is located at an entry point to a facility, responsive to determining that the number of requests received from the first user terminal is greater than a threshold number, the user terminal 102 may activate one or more further terminals at entry points in the vicinity of the first terminal in order to ease congestion.

Similarly, in an embodiment in which the facility is a theme park, ski resort or sports venue, on determining that the number of people requesting or authorized to access the park/resort/venue is greater than a predefined number, the network node 104 may activate one or more self-service sales terminals throughout the facility to avoid congestion at currently operating sales terminals.

Figure 5:
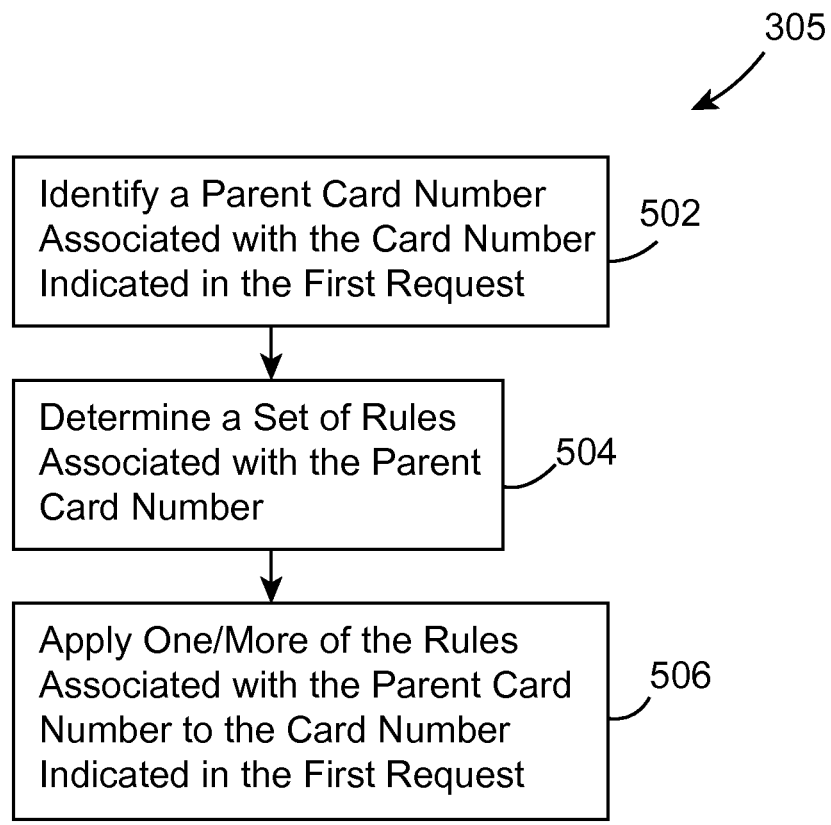
FIG. 5 is a flow diagram depicting an exemplary method of determining a set of rules associated with a card number (or primary account number PAN) in accordance with an embodiment of the disclosure.

FIG. 5 depicts an exemplary method of identifying a set of rules associated with a card number at block 305 of the method 300.

At block 502, the network node 104 determines a parent card number associated with the card number provided in the request (the 'current card number'). As with the card number provided in the request, the parent card number may be a number of a physical (regular or actual) credit and/or debit card, e.g. a number printed on a cardholder's card and linked to a cardholder's account. Additionally or alternatively the parent card number may be a virtual card number.

The network node 104 may determine the parent card number associated with the current card number in any suitable manner. In an exemplary embodiment, the access rules stored in respect of the current card number at block 128 of the registration process indicate an association or link between the current card number and the parent card number.

At block 504, the network node 504 determines a set of access rules associated with the parent card number. The network node 104 may, for example, access the rules associated with the parent card number at block 128 of the registration process.

At block 506, the network node 104 applies some or all of the rules associated with the parent card number to the current card number. In this manner, requests comprising a first card number may be authorized or refused access to a facility in accordance with the access rights associated with an associated card number.

For example, in an embodiment in which the facilities comprise ski slopes, access rules associated with a parent card number may specify that the parent can access all ski slopes. However, a child card number associated with the parent card may only be authorized to access slopes suitable for beginners or young children.

Similarly, in an embodiment in which the facilities comprise pay-per-view TV, access rules associated with a parent card number may specify that the parent can access any available channels. However, a child card number associated with the parent card may only be authorized to access children's channels.

It should be appreciated that the functions described herein, in some embodiments, may be described in computer executable instructions stored on a computer readable media (e.g., in a physical, tangible memory, etc.), and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

Further, it should be appreciated that the present disclosure is not limited to the embodiment(s) described herein but can be amended or modified without departing from the scope of the present disclosure. It will be appreciated that the methods described are by way of example only and various modifications of the disclosed methods may be made. For example, the order in which steps of the methods are performed may be altered or individual steps may be omitted.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of processing requests comprising data indicative of a card number, the method comprising:
   receiving, at a first network node, a first request comprising data indicative of a card number;
   operating a processor to:
   determine that the first request comprises a request for access at an entry point to a-facility due to the request including insufficient information to be a payment request, the entry point remote from the first network node;
   identify a set of rules associated with the card number; and
   authorize access to the requested facility in accordance with the identified set of rules;
   receiving, at a second network node, a second request comprising data indicative of the card number; and
   operating a second processor to:
   determine that the second request comprises a payment request;
   identify a payment provider associated with the card number; and
   transmit the payment request to the identified payment provider.

2. The method of claim 1, wherein at least one of the first request and the second request is received via one or more of:
   a magnetic card reader;
   an integrated circuit card terminal;
   a radio frequency identification receiver; and
   a Bluetooth™ receiver.

3. The method of claim 1, further comprising operating the processor to:
   identify a number of requests for access to the facility that are received over a predefined period of time; and
   allocate a resource in accordance with the identified number of requests.

4. The method of claim 3, wherein operating the processor to determine that the first request comprises the request for access to the facility comprises operating the processor to:
   identify, in the first request, a parameter indicative of the requested facility.

5. The method of claim 4, wherein the first request is received from a terminal located at the entry point to the facility, and wherein the parameter is indicative of the terminal location.

6. The method of claim 5, wherein operating the processor to allocate a resource in accordance with the identified number of requests comprises operating the processor to:

activate at least one further terminal to receive requests for access to the facility.

7. The method of claim 1, wherein operating the processor to identify the set of rules associated with the card number comprises operating the processor to:
determine a condition for authorized access to the facility by a holder of the card.

8. The method of claim 7, wherein the condition comprises at least one of:
a predefined period of time for which the card number is authorized to access the facility;
a predefined number of occasions on which the card number is authorized to access the facility; and
a type of facility which the card number is authorized to access.

9. The method of claim 7, wherein operating the processor to authorize access to the requested facility in accordance with the identified set of rules comprises operating the processor to:
authorize access to the requested facility in response to determining that the received request for access meets the condition; and
refuse access to the requested facility in response to determining that the received request for access does not meet the condition.

10. The method of claim 1, wherein the card number is a virtual card number.

11. The method of claim 1, wherein operating the processor to identify the set of rules associated with the card number comprises operating the processor to:
identify a parent card number associated with the card number;
determine the set of rules associated with the parent card number; and
apply the set of rules associated with the parent card number to the card number.

12. The method of claim 1, wherein operating the second processor to identify the payment provider comprises operating the processor to:
identify a parent card number associated with the card number;
determine a parent payment provider associated with the parent card number; and
identify the payment provider for the card number as the parent payment provider.

13. The method of claim 12, further comprising operating the second processor to:
identify at least one payment parameter associated with the payment request;
compare the identified payment parameter to a set of authorized payment parameters associated with the card number;
determine, based on said comparison, whether the payment request is an allowable payment request; and
responsive to determining that the payment request is an allowable payment request, effect payment from an account associated with the parent card number.

14. The method of claim 1, wherein one or more of the first request and the second request is received from a mobile computing device.

15. The method of claim 14, wherein the mobile computing device comprises a smartphone, and the one or more of the first request and the second request is received via a radio frequency identification receiver.

16. A system for processing a request comprising a card number, the system comprising:
a first node configured to receive a first request comprising data indicative of a card number from a terminal located at an entry point to a facility;
a first processor configured to:
determine that the first request comprises a request for access at the entry point to the facility, the first processor being remote from the entry point of the facility;
identify a set of rules associated with the card number; and
authorize access to the requested facility in accordance with the identified set of rules;
a second network node configured to receive a second request comprising said data; and
a second processor configured to:
determine that the second request comprises a payment request;
identify a payment provider associated with the card number; and
transmit the payment request to the determined payment provider.

17. The system of claim 16, wherein the first network node is the same as the second network node.

18. The system of claim 16, wherein the first processor is the same as the second processor.

19. A non-transitory computer-readable medium comprising instructions which, when executed, cause a processor to:
receive a first request comprising data indicative of a card number, and with regard to the first request:
determine that the first request comprises a request for access to a facility;
identify a parent card number associated with the card number;
identify a set of rules associated with the parent card number; and
authorize access to the requested facility in accordance with the identified set of rules; and
receive a second request comprising data indicative of the card number, and with regard to the second request:
determine that the second request comprises a payment request;
identify a payment provider associated with the parent card number; and
transmit the payment request to the determined payment provider.

20. The non-transitory computer-readable medium of claim 19, wherein the card number includes a virtual card number.

* * * * *